US 11,194,514 B2

(12) United States Patent
Brown

(10) Patent No.: US 11,194,514 B2
(45) Date of Patent: Dec. 7, 2021

(54) JUST IN TIME DATA PLACEMENT IN NAND FLASH

(71) Applicant: Kioxia Corporation, Tokyo (JP)

(72) Inventor: Randy Brown, Tustin, CA (US)

(73) Assignee: Kioxia Corporation, Tokyo (JP)

( * ) Notice: Subject to any disclaimer, the term of this patent is extended or adjusted under 35 U.S.C. 154(b) by 77 days.

(21) Appl. No.: 16/568,671

(22) Filed: Sep. 12, 2019

(65) Prior Publication Data

US 2020/0104074 A1 Apr. 2, 2020

Related U.S. Application Data

(60) Provisional application No. 62/738,040, filed on Sep. 28, 2018.

(51) Int. Cl.
*G06F 3/06* (2006.01)
*G06F 12/1009* (2016.01)

(52) U.S. Cl.
CPC .......... *G06F 3/0659* (2013.01); *G06F 3/0604* (2013.01); *G06F 3/0653* (2013.01); *G06F 3/0679* (2013.01); *G06F 12/1009* (2013.01); *G06F 2212/7201* (2013.01)

(58) Field of Classification Search
CPC .... G06F 3/0659; G06F 3/0604; G06F 3/0679; G06F 3/0653; G06F 12/1009; G06F 12/0246; G06F 2212/7201; G06F 2212/7208; G06F 2212/7202
See application file for complete search history.

(56) References Cited

U.S. PATENT DOCUMENTS

| | | | |
|---|---|---|---|
| 2017/0090802 A1* | 3/2017 | Margetts | G06F 3/0625 |
| 2018/0321945 A1* | 11/2018 | Benisty | G06F 13/385 |
| 2018/0336960 A1* | 11/2018 | Chu | G06F 11/0757 |
| 2019/0065056 A1* | 2/2019 | Song | G06F 12/0238 |

* cited by examiner

*Primary Examiner* — Hiep T Nguyen
(74) *Attorney, Agent, or Firm* — Allen & Overy LLP

(57) ABSTRACT

A memory system includes a memory array and a memory controller. The memory array includes a plurality of memory dies communicatively coupled via a plurality of memory channels, each memory channel communicatively coupled to a subset of the plurality of memory dies. The memory controller includes a command scheduler configured to determine an operator status of each memory die of the memory array, determine, based on the operator status of each of the memory dies, an order in which to output commands to the memory dies, update a mapping table based on the determined order in which to output the commands to the memory dies of the memory array, and output the commands to the memory dies of the memory array in the determined order in the mapping table.

17 Claims, 4 Drawing Sheets

JUST IN TIME DATA PLACEMENT IN NAND FLASH

CROSS-REFERENCE TO RELATED APPLICATIONS

This application is based upon and claims the benefit of priority from U.S. Provisional Application No. 62/738,040, filed on Sep. 28, 2018; the entire contents of which are incorporated herein by reference.

FIELD OF THE INVENTION

The present invention generally relates to systems and methods to schedule transmission of commands to NAND devices in a memory system.

BACKGROUND OF THE INVENTION

A solid state device (SSD) includes a plurality of NAND devices organized into banks which process commands and operations. SSDs include a scheduler which determines an order in which commands, including read, write, and erase commands, should be sent to the banks such that overall progress is made on the commands in the queues. This includes ensuring that low-latency operations such as reads are not queued behind longer-latency operations such as erases, and ensuring that the order of requests from application block requests, meta-data requests, and garbage collection requests are appropriately handled. In some cases, the scheduler manages a power consumption of the device as a whole. Since each of reads, writes, and erases consume different power, the operation scheduler may control overall device power consumption by controlling how many of each operation is active at a time.

Traditionally, command scheduling systems have a dedicated scheduler assigned to each bank of devices. The scheduler determines the optimal arrangement of priority and normal priority commands to be transmitted to the bank of devices. The schedule of commands transmitted to the bank of devices allows the system to more efficiently transmit and execute commands.

Conventionally, a scheduler sends data formatted as a RAID stripe to multiple banks over multiple channels in a well-defined sequence, where the RAID stripe is split into multiple data segments. The segments are written in a fixed sequence to the banks. In doing this, a RAID stripe may be written as multiple segments in parallel to multiple banks (i.e. simultaneously) thereby improving the data throughput rate. Write commands containing the segments occur in groups called windows to allow diffusion of host data across the NAND devices. Stripes or windows improve parallelism and throughput for subsequent read commands. On the other hand, sending data to a bank in a well-defined sequence reduces throughput for write commands if one or more of the die receiving the write command for a segment is busy with a previous command, causing the writing of the RAID stripe as a whole to stall. Accordingly, there is a long-felt need to correct the problems inherent to present day systems.

BRIEF DESCRIPTION OF THE INVENTION

In an aspect, a memory system includes a memory array and a memory controller. The memory array includes memory dies communicatively coupled via memory channels to the memory controller. Each memory channel is communicatively coupled to a subset of the memory dies. The memory controller includes a command scheduler configured to determine an operator status of each memory die of the memory array, determine, based on the operator status of each of the memory dies, an order in which to output commands to the memory dies, update a mapping table based on the determined order in which to output the commands to the memory dies of the memory array, and output the commands to the memory dies of the memory array in the determined order in the mapping table.

In some embodiments, the memory controller includes status indicators that store the operator status of each of the memory dies of the memory array. In other embodiments, the command scheduler is configured to receive the status indicators and determine the operator status of each memory die of the memory array based on the received status indicators.

In certain embodiments, the order is further determined based on a priority of stripes of commands. According to certain embodiments, the memory controller includes a host interface configured to receive commands from a host.

In some embodiments, the command scheduler is configured to update the mapping table before outputting the commands to the memory dies of the memory array. In other embodiments, the command scheduler is configured to output the commands to the memory dies of the memory array before updating the mapping table.

In another aspect, a memory system includes a memory array and a memory controller. The memory array includes memory dies communicatively coupled via memory channels to the memory controller. Each memory channel is communicatively coupled to a subset of the memory dies. The memory controller includes a command scheduler configured to determine an operator status of each memory die of the memory array, determine, based on the operator status of each of the memory dies, an order in which to output commands to a group of dies of the memory array that is available to receive a strip of data, update a mapping table based on the determined order in which to output the commands to the memory dies of the memory array, and output the commands to the memory dies of the memory array in the determined order in the mapping table.

In another aspect, a method of scheduling a distribution of commands to memory dies includes determining an operator status of each of memory dies in a memory array. The memory dies are communicatively coupled via memory channels to a memory controller. Each memory channel is communicatively coupled to a subset of the memory dies. The method also includes determining, based on the operator status of each of the memory dies of the memory array, an order in which to output commands to the memory dies of the memory array, updating a mapping table based on the determined order in which to output commands to the memory dies of the memory array, and outputting the commands to the memory dies of the memory array in the determined order in the mapping table.

DETAILED DESCRIPTION OF THE INVENTION

Figure 1:
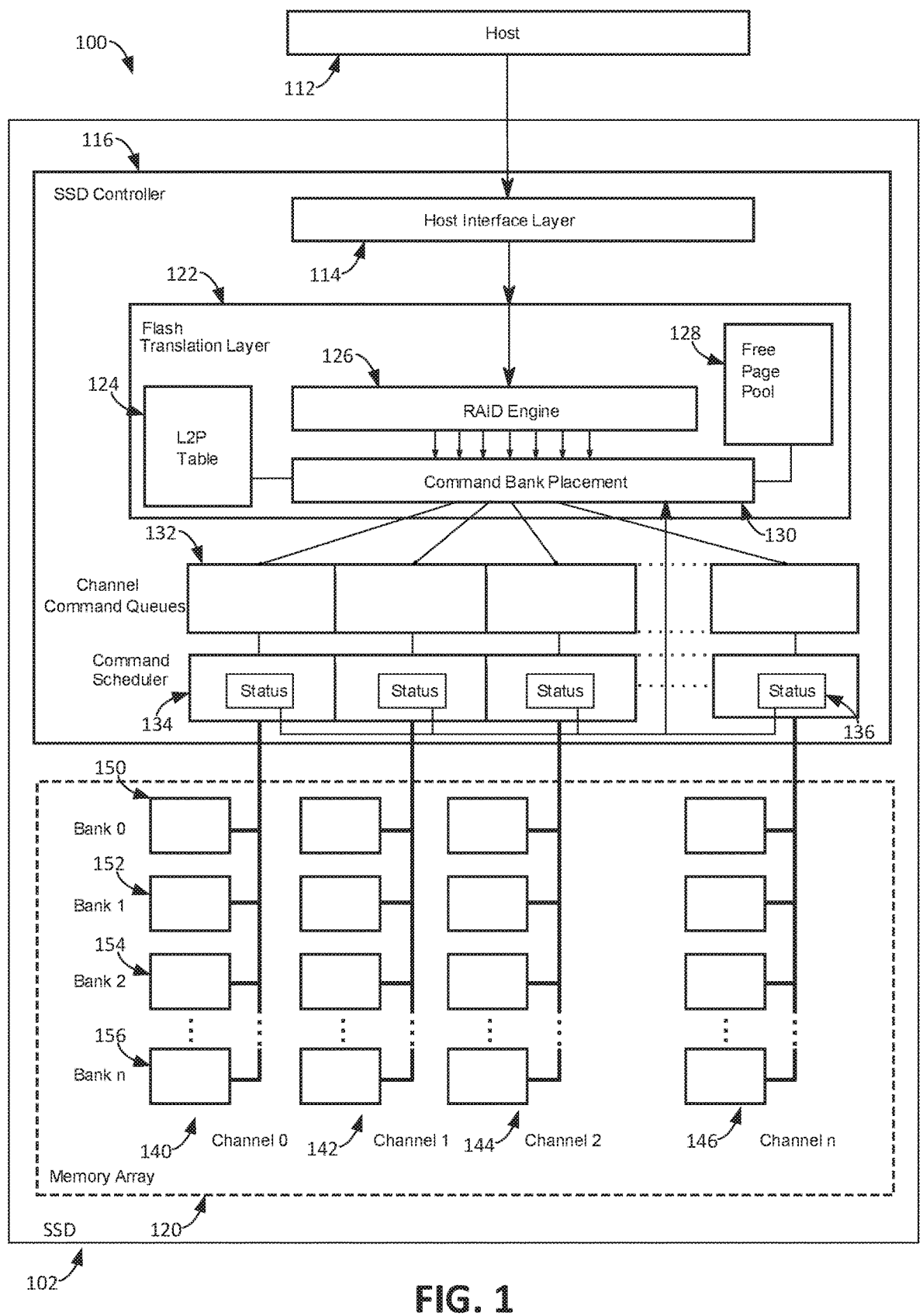
FIG. 1 shows a block diagram of an SSD comprising an SSD controller and a memory array, according to an embodiment.

FIG. 1 is a system diagram 100 schematically illustrating the structure of a solid-state drive (SSD) 102, in accordance with an embodiment of the present invention.

The host device 112 connects to the SSD 102 via a host interface layer 114 conforming to a communication interface standard. The SSD 102 functions as an external mass storage device of the host device 112. Examples of the communication interface standard between the SSD 102 and the host device 112 include SATA (Serial Advanced Technology Attachment), SAS (Serial Attached SCSI), PCIe (Peripheral Components Interconnect Express).

The SSD 102 comprises a SSD controller 116 and a memory array 120, which in an embodiment comprises an array of NAND devices. The SSD controller 116 comprises a host interface layer 114 and a flash translation layer (FTL) 122. The FTL 122 includes a logic-to-physical (L2P) table 124, a RAID engine 126, a free page pool 128, and a command bank placement function 130. The command bank placement function 130 includes channel command queues 132 and command scheduler 134.

The SSD controller 116 interfaces to the memory array 120 by one or more flash memory buses, called channels. For simplicity, FIG. 1 shows only four channels although there may be 8, 16, or more channels. Each channel is connected to multiple NAND memory devices which in one embodiment are arranged in a column with one or more memory dies within each device. Other embodiments of arrangements of the NAND memory devices may be possible and within the scope of this disclosure. FIG. 1 shows one example of an arrangement, where the memory array 120 comprises NAND devices arranged in columns 140, 142, 144, and 146, with each NAND device column comprising one or more dies coupled to the SSD controller 116 by a channel, respectively. In one embodiment, the dies or devices may be grouped together into units (i.e., banks) which are independently selectable using chip enable signals. For simplicity, FIG. 1 shows n banks per channel (for example, Bank 0, Bank 1, Bank 2 . . . Bank n) although there may be 8, 16, or more banks per channel. The NAND device columns 140, 142, 144, and 146 comprise n banks. The first NAND device column 140 includes a first bank (Bank 0) 150, a second bank (Bank 1) 152, a third bank (Bank 2) 154, and n$^{th}$ bank 156 coupled to the SSD controller 116 and command scheduler 134 by the channel. The n banks form rows of the memory array 120. The memory array 120 comprise nonvolatile (non-transitory) NAND memory devices (e.g., first NAND device column 140) configured to store data read and written from and into the host device 112, respectively. The SSD controller 116 executes data transfer control on the SSD 102. The SSD 102 also includes random-access memory (not shown) that temporarily stores data transferring between the host 112 and the memory array 120 by the SSD controller 116. The random-access memory (RAM) functions as a data cache memory of the memory array 120, and may employ dynamic random access memory (DRAM), ferroelectric random access memory (FeRAM), magnetoresistive random access memory (MRAM), and the like.

The command bank placement function 130 controls the scheduling of memory commands issued to banks of the memory array 120 over the channels. The command bank placement function 130 comprises logic blocks that provide bit operation and support logic for column selection and bank selection within a column of memory array 120. The logic blocks comprises hardware, including logic gates and direct hardware inputs indicating statuses of the devices in the columns of the memory array 120. Upon receiving the statuses of the devices in the columns of the memory array 120, the command bank placement function 130 updates the L2P table 124 to record the physical locations of the data associated with the original logical address for the host. The logic blocks enable the command bank placement function 130 to schedule commands being transmitted to the banks of the columns of the memory array 120 in order to make efficient use of the channels.

In addition to the command placement function 130, the command scheduler 134 determines a processing order of commands from the host 112. The command scheduler 134 issues the commands to the dies of the banks of the memory array 120 in the processing order over the channels. The command scheduler 134 comprises logic blocks that provide bit operation and support logic for die selection within a bank of memory array 120. Command scheduler 134 includes status indicator 136, which provides information regarding the workload of the dies of the banks of the memory array 120. Each die of a bank of memory array 120 has a corresponding status indicator 136. For example, status indicator 136 may indicate that a die of bank 150 is busy or idle. Status indicators 136 can be implemented using direct hardware inputs or as a register that is updated once the status of a die has changed (for example, finishing a read, erase, or write command). In one embodiment, the SSD controller 116 updates the status indicators 136 based on the commands that are in progress in the channel command queues 132. For example, if a die has been issued a command, the SSD controller 116 can update the status indicators 136 once the channel command queues have been cleared. Command scheduler 134 can use this information to determine a more optimal order in which commands from the host 112 are transmitted to the dies in a bank of the memory array 120 over the channel. For example, if a die in a bank is busy, that die is skipped and the next die that is ready receives the data instead.

Figure 2:
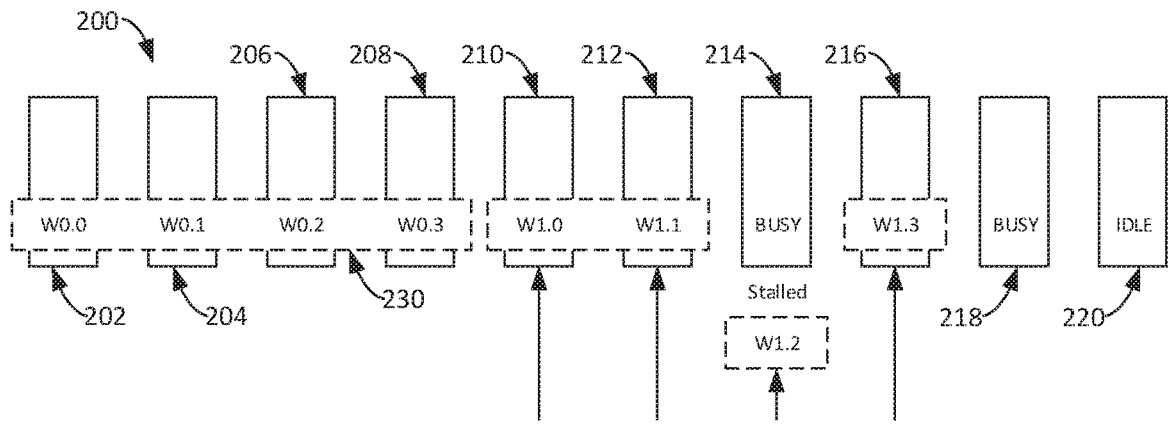
FIG. 2 shows a block diagram of a bank of memory dies receiving a write command, according to an embodiment.

FIG. 2 shows a segment 200 of a bank (for example, bank 150) having dies 202-220, in accordance with an embodiment of the present invention. In this embodiment, dies 202-208 have been written to with stripe 230. Stripe 230 is a defined sequence of data that is written to a group of dies 202-208. For example, command scheduler 134 can schedule stripe 230 to be written to dies 202-208 over a number of channels. Typically, writes to dies (for example, dies 202-208) occur in groups called windows or stripes to allow diffusion of host data across NAND die. This allows for improved parallelism and throughput during subsequent read commands of individual stripes (for example, stripe 230). In one embodiment, before the command scheduler 134 schedules stripe 230 to be written to dies 202-208, command bank placement function 130 can schedule stripe 230 to be written to the bank (for example, bank 150) that corresponds to segment 200.

However, sending stripes to a bank in a defined sequence reduces throughput for write commands if one or more of the die receiving the write command is busy with a previous command. For example, as shown in FIG. 2, command scheduler 134 has issued a write command to dies 210-216. In this example, die 214 is busy finishing a previous command while dies 210, 212, and 216 are ready to receive the data. As a result, the write command to dies 210-216 is delayed until die 214 is finished with the previous command and is ready to receive the data. In this example, the write throughput is paced if a NAND die is busy (for example, finishing a read, erase, or write command). Write throughput can be improved if the command scheduler 134 takes die 214's busy status into account, and instructs the write command to be shifted to another die that is idle (for example, die 220).

Figure 3A:
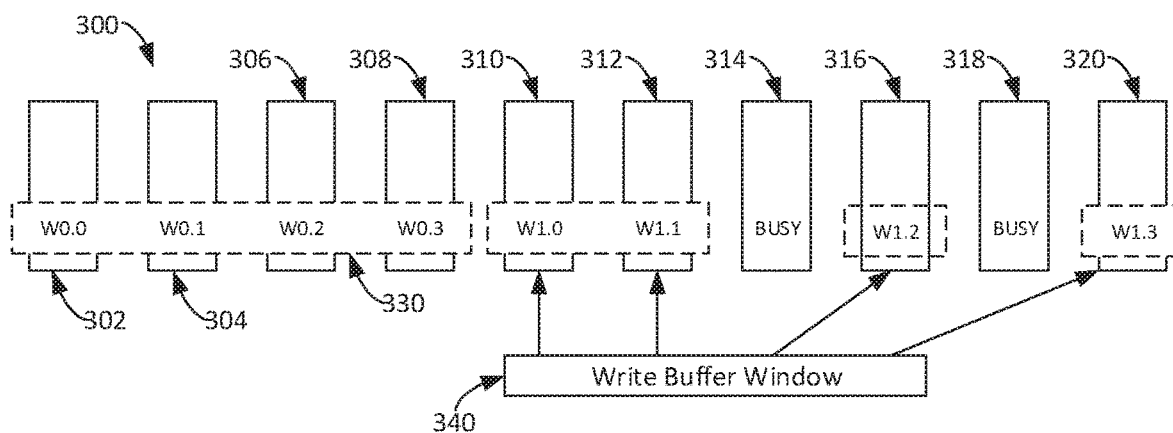
FIG. 3A shows a block diagram of a bank of memory dies receiving a write command from a write buffer window, according to an embodiment.
Figure 3B:
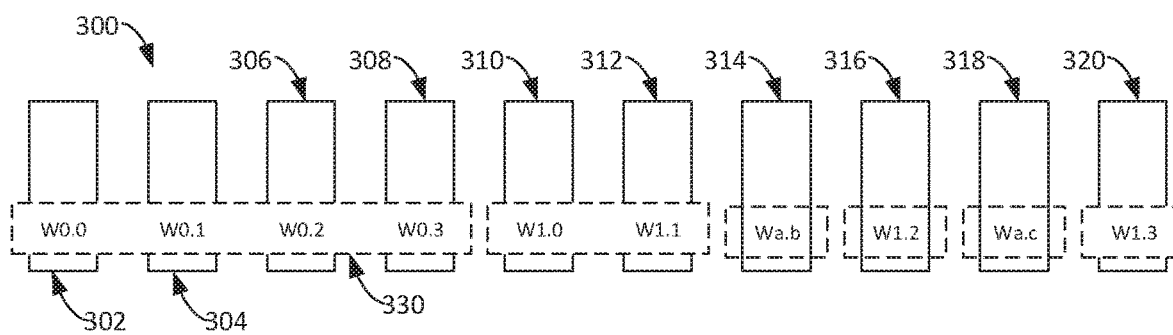
FIG. 3B shows a block diagram of the bank of FIG. 3A after receiving the write command from the write buffer window, according to an embodiment.

FIGS. 3A and 3B show a segment 300 of a bank (for example, bank 150) having dies 302-320 receiving a write command from a write buffer window, according to an embodiment of the present invention. In this embodiment, dies 302-308 have been written to with stripe 330. Stripe 330 is a defined sequence of data that is written to a group of neighboring dies 302-308. For example, command scheduler 134 can schedule stripe 330 to be written to dies 302-308 over a channel. In one embodiment, before the command scheduler 134 schedules stripe 330 to be written to dies 302-308, command bank placement function 130 can schedule stripe 330 to be written to the bank (for example, bank 150) that corresponds to segment 300.

Similar to segment 200, illustrated in FIG. 2, some of the dies in segment 300 are busy and are not available to receive data. For example, as shown in FIG. 3A, dies 314 and 318 are busy with a previous command. The status of dies 302-320 can be stored in status indicator 136, which provides information regarding the workload of the dies of the banks of the memory array 120. Status indicators 136 can be implemented using direct hardware inputs or as a register that is updated once the status of a die has changed (by issuing a status request command, for example after issuing a read, erase, or write command). In one embodiment, the SSD controller 116 updates the status indicators 136 based on the commands that are in progress in the channel command queues 132. In the above example, if dies 314 and 318 has been issued a command, the SSD controller 116 can update the status indicators 136 once the channel command queues have been cleared.

Command scheduler 134 can use the information stored in status indicator 136 to determine a more optimal order in which commands from the host 112 are transmitted to dies 302-320 in segment 300 of bank 150. This approach uses just-in-time placement to assign data in a stripe to dies that are not busy. This approach is sometimes referred to as a pull model, whereby available work is paired with available resources. The resource pulls work, waiting for available work rather than work waiting for available resources.

For example, as shown in FIG. 3A, data corresponding to a stripe is held in write buffer window 340 before being written to available dies. In this example, dies 310, 312, 316, and 320 are available to receive the data. Command scheduler 134 uses status indicators 136 to determine that dies 310, 312, 316, and 320 are available to receive data and dies 314 and 318 are busy. The stripe is then transmitted from the write buffer window 340 to dies 310, 312, 316, and 320 in a sequence corresponding to the stripe. L2P table 124 is updated to record the physical locations of the data associated with the original logical address for the host. As shown in FIG. 3B, when the write command is completed, the read parallelism is still provided for even though the exact order of placement may differ from a rigid sequence.

For simplicity, the size of the windows shown in FIGS. 2 and 3 are 4 NAND dies although there may be 8, 16, or more NAND dies per window. Further, the granularity could be larger than a single die. For example, as shown in FIG. 4, the command scheduler 134 can determine a group of available consecutive dies that can receive the window in a defined sequence.

Figure 4A:
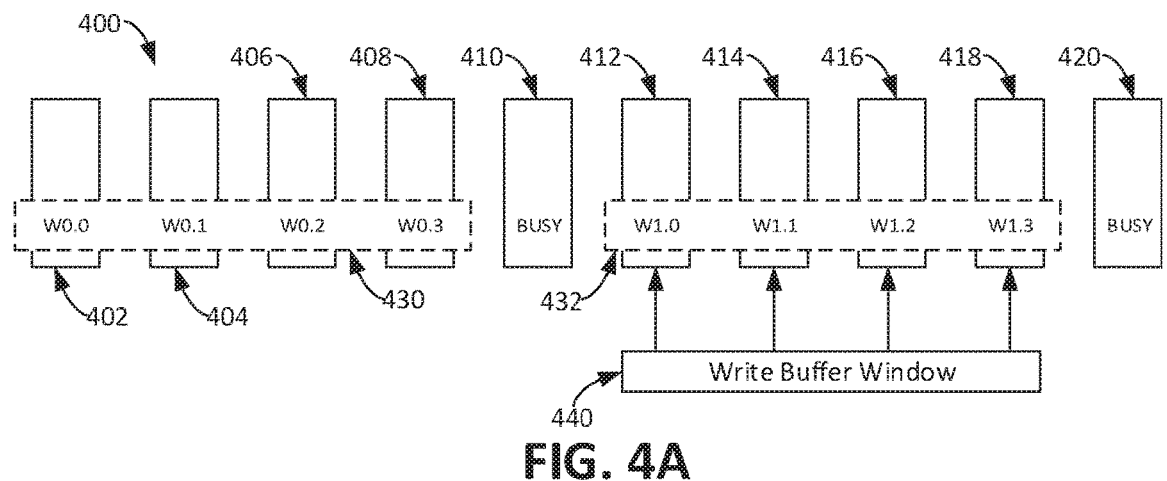
FIG. 4A shows a block diagram of a bank of memory dies receiving a write command from a write buffer window, according to an embodiment.
Figure 4B:
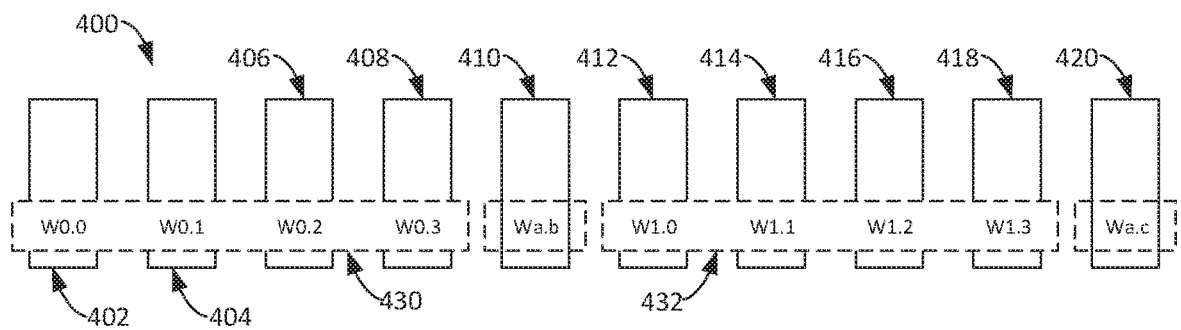
FIG. 4B shows a block diagram of the bank of FIG. 4A after receiving the write command from the write buffer window, according to an embodiment.

FIGS. 4A and 4B show a segment 400 of a bank (for example, bank 150) having dies 402-420 receiving a write command from a write buffer window, according to an embodiment of the present invention. In this embodiment, dies 402-408 have been written to with stripe 430. Stripe 430 is a defined sequence of data that is written to a group of neighboring dies 402-408. For example, command scheduler 134 can schedule stripe 430 to be written to dies 402-408 over a channel. In one embodiment, before the command scheduler 134 schedules stripe 430 to be written to dies 402-408, command bank placement function 130 can schedule stripe 430 to be written to the bank (for example, bank 150) that corresponds to segment 400.

Similar to segments 200 and 300, illustrated in FIGS. 2 and 3, some of the dies in segment 400 are busy and are not available to receive data. For example, as shown in FIG. 4A, dies 410 and 420 are busy with a previous command. The status of dies 402-420 can be stored in status indicator 136, which provides information regarding the workload of the dies of the banks of the memory array 120. Status indicators 136 can be implemented using direct hardware inputs or as a register that is updated once the status of a die has changed (by issuing a read status command, for example after issuing a read, erase, or write command). In one embodiment, the SSD controller 116 updates the status indicators 136 based on the commands that are in progress in the channel command queues 132. In the above example, if dies 410 and 420 has been issued a command, the SSD controller 116 can update the status indicators 136 once the channel command queues have been cleared.

Command scheduler 134 can use the information stored in status indicator 136 to determine a more optimal order in which commands from the host 112 are transmitted to dies 402-420 in segment 400 of bank 150. For example, as shown in FIG. 4A, data corresponding to a stripe 432 is held in write buffer window 440 before being written to a group of available dies. In this example, a group of consecutive dies consisting of dies 412-418 are available to receive the data. Command scheduler 134 uses status indicators 136 to determine that the group of consecutive dies 412-418 is available to receive stripe 432 and dies 410 and 420 are busy. Stripe 432 is then transmitted from the write buffer window 440 to dies 412-418 in a sequence corresponding to the stripe. L2P table 124 is updated to record the physical locations of the data associated with the original logical address for the host. As shown in FIG. 4B, when the write command is completed, the read parallelism is still provided for and the exact order of placement is still a continuous sequence.

Figure 5:
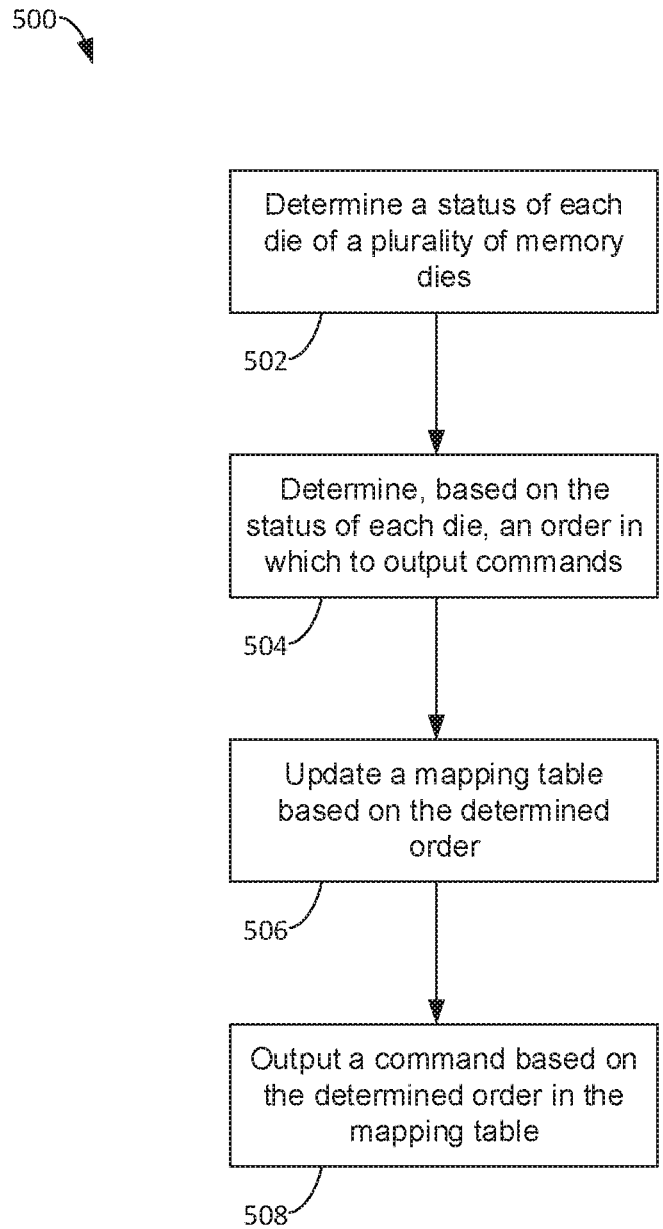
FIG. 5 shows a flow chart of a process for scheduling a distribution of commands to memory dies based on workflow status, according to an embodiment.

FIG. 5 shows a flow chart 500 that illustrates a process for scheduling a distribution of commands to memory dies based on workflow status, according to an embodiment. At step 502, an operator status of each die of a plurality of memory dies in memory array 120 is determined. In one embodiment, the memory dies of the memory array 120 are arranged in columns of dies, each column corresponding to a channel, and a plurality of rows, each row corresponding to a bank of memory dies. For example, status indicators 136 can include information regarding the current workload of a bank (for example, bank 150) and the status of individual dies of the bank.

At step 504, an order in which to output commands to the memory dies of the memory array 120 is determined based on the operator status of each die in the bank. For example, command scheduler 134 can use the information stored in status indicator 136 to determine a more optimal order in which commands from the host 112 are transmitted to dies 302-320 in segment 300 of bank 150. Data corresponding to a stripe is held in write buffer window 340 before being written to available dies. In this example, dies 310, 312, 316, and 320 are available to receive the data. Command scheduler 134 uses status indicators 136 to determine that dies 310, 312, 316, and 320 are available to receive data and dies 314 and 318 are busy. In some embodiments, as shown in FIG. 4, command scheduler 134 can use status indicators 136 to determine that the group of consecutive dies 412-418 is available to receive stripe 432 and dies 410 and 420 are busy.

At step 506, a mapping table is updated based on the determined order. For example, L2P table 124 is updated to record the physical locations of the data associated with the original logical address for the host. In one embodiment, upon receiving the statuses of the devices in the columns of the memory array 120, the command bank placement function 130 updates the L2P table 124.

At step 508, the commands are output in the determined order in the mapping table. For example, as shown in FIG. 3A, the stripe is transmitted from the write buffer window 340 to dies 310, 312, 316, and 320 in a sequence corresponding to the stripe. As shown in FIG. 3B, when the write command is completed, the read parallelism is still provided for even though the exact order of placement may differ from a rigid sequence.

Other objects, advantages and embodiments of the various aspects of the present invention will be apparent to those who are skilled in the field of the invention and are within the scope of the description and the accompanying Figures. For example, but without limitation, structural or functional elements might be rearranged consistent with the present invention. Similarly, principles according to the present invention could be applied to other examples, which, even if not specifically described here in detail, would nevertheless be within the scope of the present invention.

What is claimed is:

1. A memory system comprising:
 a memory array including:
  a plurality of memory dies communicatively coupled via a plurality of memory channels to a memory controller, each memory channel communicatively coupled to a subset of the plurality of memory dies; and
 the memory controller including a command scheduler configured to:
  determine an operator status of each memory die of the memory array;
  determine, based on the operator status of each of the memory dies, an order in which to output a plurality of commands to the memory dies;
  update a mapping table based on the determined order in which to output the plurality of commands to the memory dies of the memory array; and
  output the plurality of commands to the memory dies of the memory array in the determined order in the mapping table.

2. The memory system of claim 1, wherein the memory controller further comprises status indicators storing the operator status of each of the memory dies of the memory array.

3. The memory system of claim 2, wherein the command scheduler is configured to receive the status indicators and determine the operator status of each memory die of the memory array based on the received status indicators.

4. The memory system of claim 1, wherein the command scheduler is configured to update the mapping table before outputting the plurality of commands to the memory dies of the memory array.

5. The memory system of claim 1, wherein the command scheduler is configured to output the plurality of commands to the memory dies of the memory array before updating the mapping table.

6. The memory system of claim 1, wherein the memory controller further comprises a host interface configured to receive commands from a host.

7. A memory system comprising:
 a memory array including:
  a plurality of memory dies communicatively coupled via a plurality of memory channels to a memory controller, each memory channel communicatively coupled to a subset of the plurality of memory dies; and
 the memory controller comprising a command scheduler configured to:
  determine an operator status of each memory die of the memory array;
  determine, based on the operator status of each of the memory dies, an order in which to output a plurality of commands to a group of dies of the memory array that is available to receive a strip of data;
  update a mapping table based on the determined order in which to output the plurality of commands to the memory dies of the memory array; and
  output the plurality of commands to the memory dies of the memory array in the determined order in the mapping table.

8. The memory system of claim 7, wherein the memory controller further comprises status indicators storing the operator status of each of the memory dies of the memory array.

9. The memory system of claim 8, wherein the command scheduler is configured to receive the status indicators and determine the operator status of each memory die of the memory array based on the received status indicators.

10. The memory system of claim 7, wherein the command scheduler is configured to update the mapping table before outputting the plurality of commands to the memory dies of the memory array.

11. The memory system of claim 7, wherein the command scheduler is configured to output the plurality of commands to the memory dies of the memory array before updating the mapping table.

12. The memory system of claim 7, wherein the memory controller further comprises a host interface configured to receive commands from a host.

13. A method of scheduling a distribution of commands to memory dies, the method comprising:
 determining an operator status of each of a plurality of memory dies in a memory array, wherein the plurality of memory dies are communicatively coupled via a plurality of memory channels to a memory controller, each memory channel communicatively coupled to a subset of the plurality of memory dies;

determining, by the memory controller, based on the operator status of each of the memory dies of the memory array, an order in which to output a plurality of commands to the memory dies of the memory array;

updating, by the memory controller, a mapping table based on the determined order in which to output the plurality of commands to the memory dies of the memory array; and outputting, by the memory controller, the plurality of commands to the memory dies of the memory array in the determined order in the mapping table.

14. The method of claim 13, further comprising storing, by the memory controller, the operator status of each of the memory dies of the memory array in status indicators.

15. The method of claim 14, determining, by the memory controller, the operator status of each memory die of the memory array based on the status indicators.

16. The method of claim 13, wherein updating the mapping table occurs before outputting the plurality of commands to the memory dies of the memory array.

17. The method of claim 13, wherein outputting the plurality of commands to memory dies of the memory array occurs before updating the mapping table.

* * * * *